US005481811A

United States Patent [19]
Smith

[11] Patent Number: 5,481,811
[45] Date of Patent: Jan. 9, 1996

[54] UNIVERSAL INSPECTION WORKPIECE HOLDER

[75] Inventor: Larry L. Smith, Leonard, Mich.

[73] Assignee: The Budd Company, Troy, Mich.

[21] Appl. No.: 156,313

[22] Filed: Nov. 22, 1993

[51] Int. Cl.⁶ .................................. B25B 1/00; F16B 1/00
[52] U.S. Cl. .................. 33/573; 33/568; 33/613; 411/348; 269/88
[58] Field of Search ........................... 33/573, 568, 562, 33/613, 619–621, 623; 269/88, 9, 95, 99, 100, 283, 284, 900; 411/343, 348, 347, 350

[56] References Cited

U.S. PATENT DOCUMENTS

| | | | |
|---|---|---|---|
| 3,101,641 | 8/1963 | Walker et al. | 411/348 |
| 3,381,554 | 5/1968 | Ploch et al. | 33/623 X |
| 4,711,437 | 12/1987 | Longenecker et al. | 269/100 X |
| 4,968,012 | 11/1990 | Haddad et al. | |
| 5,026,033 | 6/1991 | Roxy. | |
| 5,318,284 | 6/1994 | Demmeler et al. | 269/88 |

*Primary Examiner*—Alvin Wirthlin
*Attorney, Agent, or Firm*—Harness, Dickey & Pierce

[57] ABSTRACT

A modular system for the support and positioning of a workpiece for use with a device such as an inspection system. The system includes a base having a plurality of exterior faces, at least some of which have an array of equally spaced holes forming a grid pattern. At least one riser is attached to the base cube by a fastener, which can be inserted into the riser by defeating an outwardly biased locking member at the inner end of the fastener, extending through said riser and into the holes of the base cube. The fastener is used to provide positive location and fastening of the risers to the base cube. Functions of individual risers include support, clamping, datum point positioning and providing reference points.

15 Claims, 5 Drawing Sheets

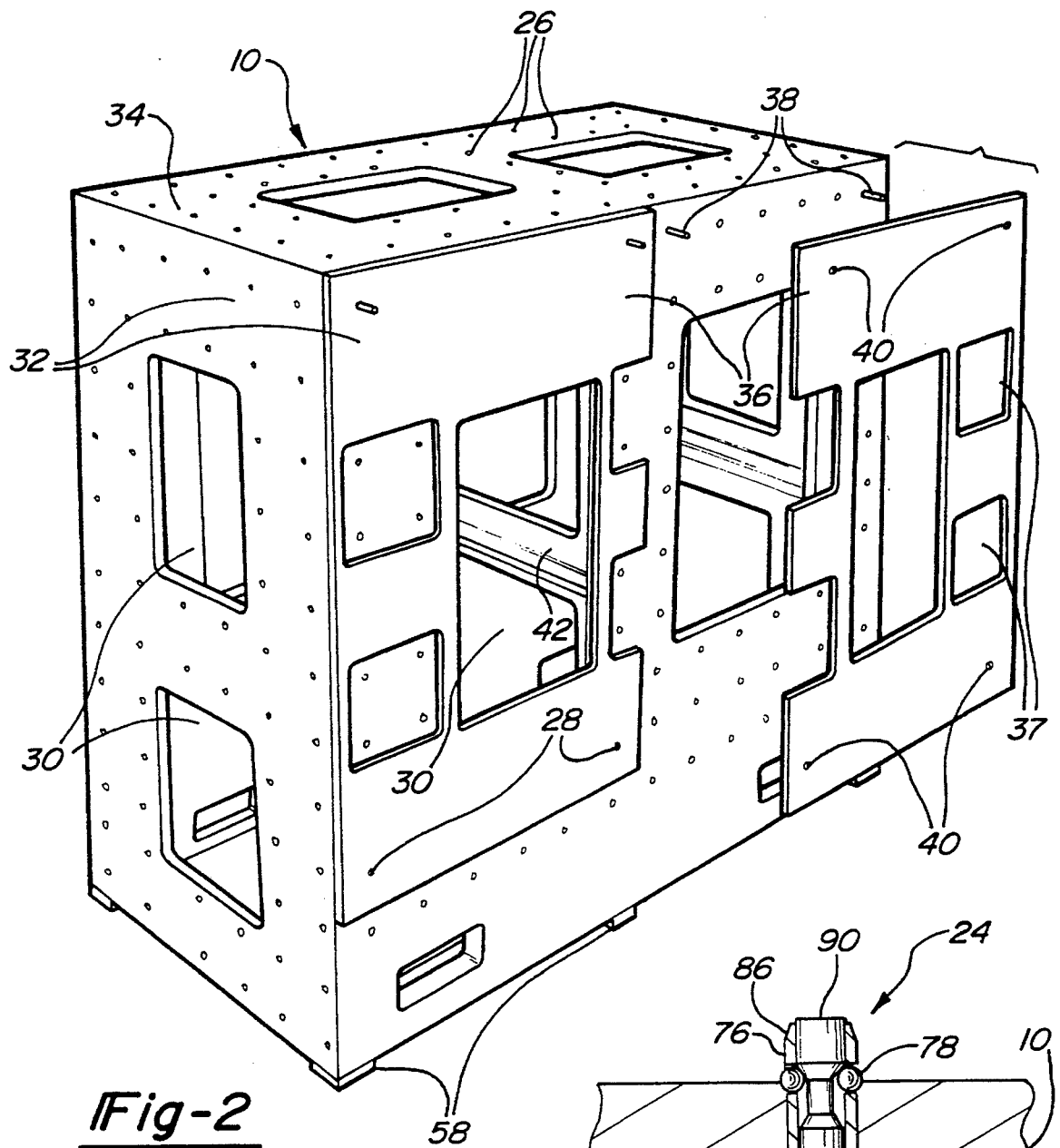
_Fig-2_
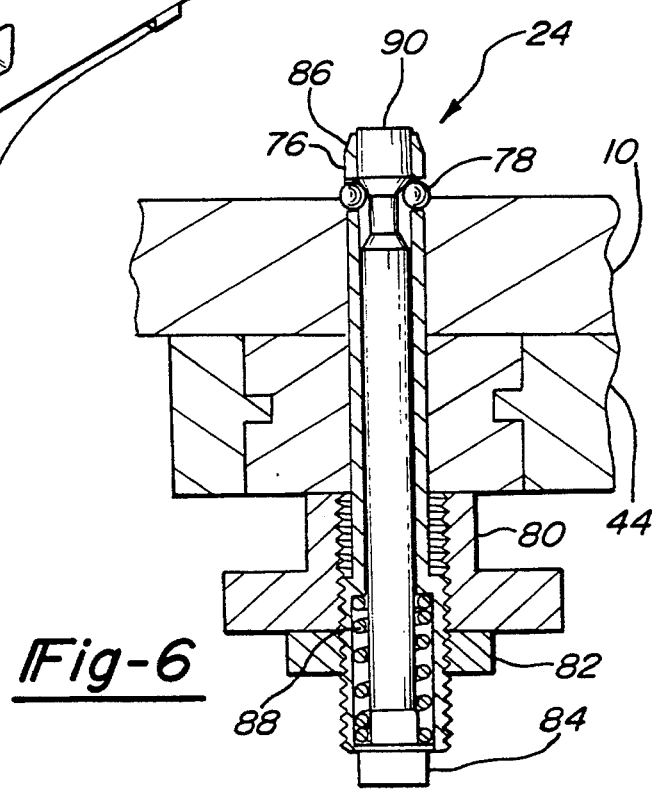
_Fig-6_

UNIVERSAL INSPECTION WORKPIECE HOLDER

BACKGROUND OF THE INVENTION

1. Technical Field

This invention relates generally to an apparatus and method for holding workpieces during inspection or dimensional checking.

2. Discussion

In the manufacturing environment, parts are manufactured to strict specifications. For quality control purposes, these parts are checked on a scheduled basis against a master part or a set of specifications. With the constant demand for continual improvement in the manufacturing processes and cost reduction, design tolerances and cost budgets are becoming more stringent. Dimensional control checks are normally performed on the parts using jig and fixture arrangements that support the parts in predetermined locations. Once the part is secured in this predetermined location, dimension checking can be achieved by a manual process, such as plug gages or datamytes or automated systems, like CMM machines. In either case, it is critical that the parts can be repeatedly placed in the same location.

In the past, specific holding devices were often constructed for each part. An array of fixed stanchions would be mounted to a base that would support a part. This method is very costly since the fixture can typically be used for only one part. The fixtures are large and bulky creating a serious storage problem.

Similarly, the parts have a limited life. When a major change is made to the part or the part is deleted, the fixture becomes obsolete. To try and reduce this waste, several inventions have been purposed to use the same base and supporting means, reducing the amount of waste when a part becomes obsolete.

U.S. Pat. No. 5,026,033 to Roxy discloses this type of adjustable alignment positioners using a master base template. A series of threaded holes are used and single point attachments are inserted to support the piece. Although this system is effective, lengthy setup times are required. Locations of the attachments must be predetermined and the repeatability of the fixture must be checked and verified.

U.S. Pat. No. 4,968,012 to Haddad et al. discloses a modular workpiece having precisely drilled counter-bored holes forming a matrix for attaching stanchions thereto. The holes alternate in diameter between a larger diameter and a smaller diameter and use a combination of a round and diamond shape attaching means with precision bushings therein. This system is very costly due to the precision required when drilling the matrix in each face of the cube, the bushings, and manufacturing the pin assembly. Additionally, the tolerance stack-up inherent in this system adds an additional burden when manufacturing.

This invention eliminates one or more of the above-described problems as well as provides a workpiece holding apparatus which is easier to manufacture, allows for quick setup, provides universal support means, and affords positive and repeatable location of a plurality of parts.

SUMMARY OF THE INVENTION

An apparatus made in accordance with the teachings of the present invention includes a hollow base cube with a plurality of exterior faces, at least some of which have an array of equally spaced holes forming a grid pattern. At least one riser is used for accepting a device for supporting the part. Attachment means is used to provide positive location and fastening of the risers to the base cube. The attachment means includes a pin and at least one locking member located near the inner end of the pin. The locking member is normally biased in a radially outward direction but can be overcome by control means that allow the pin to pass through apertures in the riser base and holes in the base cube. The control means is thereafter released to return the locking member to its normally biased position to thereby lock the attachment means in place to fasten the risers to the base cube.

In a preferred embodiment, the riser has four apertures, the first of which is a four way locating hole, being strictly toleranced and circular in geometry. The second aperture is located in a second corner diagonally opposed the first aperture and is in the form of a slot with its narrowest width substantially the same size as the first aperture. The third aperture is located at a third corner of the base plate and has a circular geometry with a diameter greater than the diameter of the first aperture, and a fourth aperture located in a fourth corner diagonally opposite the third aperture has a circular geometry with a diameter greater than the diameter of the first aperture. The apertures are formed in radially notched slugs integrally cast into the riser.

Also, the preferred embodiment slugs are fixedly placed in predetermined support wells of a sand mold to approximately align with the hole array of the base cube. The slugs are then locked into place by forming them into the sand mold. The sand mold is inserted into a two-piece riser mold to support the slugs as molten material is poured into the two-piece mold. Once the casting is set and cooled, it is released from the two-piece mold and the excess flash and burrs are removed. The riser base is then machined to give the top and bottom of the riser base finished parallel surfaces to one another. The slugs are then precision bored so the axial center of each slug is parallel to each other and perpendicular to the bottom of the riser base.

BRIEF DESCRIPTION OF THE DRAWING

The various advantages of the present invention will become apparents to one skilled in the art upon reading the following specification and by reference to the drawings in which:

FIG. 2 is a perspective view of the base cube illustrating the templates, protective foot pads, inner ribs, weight reduction and lifting holes;

FIG. 6 is a cross-sectional view of the fastener, riser, and base, illustrating the "fastened" position.

DESCRIPTION OF THE PREFERRED EMBODIMENT

It should be understood from the outset that while the present invention will be described primarily in connection with one specific example, this example is simply a best mode of currently practicing the invention and that other modifications can be made to this specific example without departing from the spirit and scope of the invention.

Figure 1:
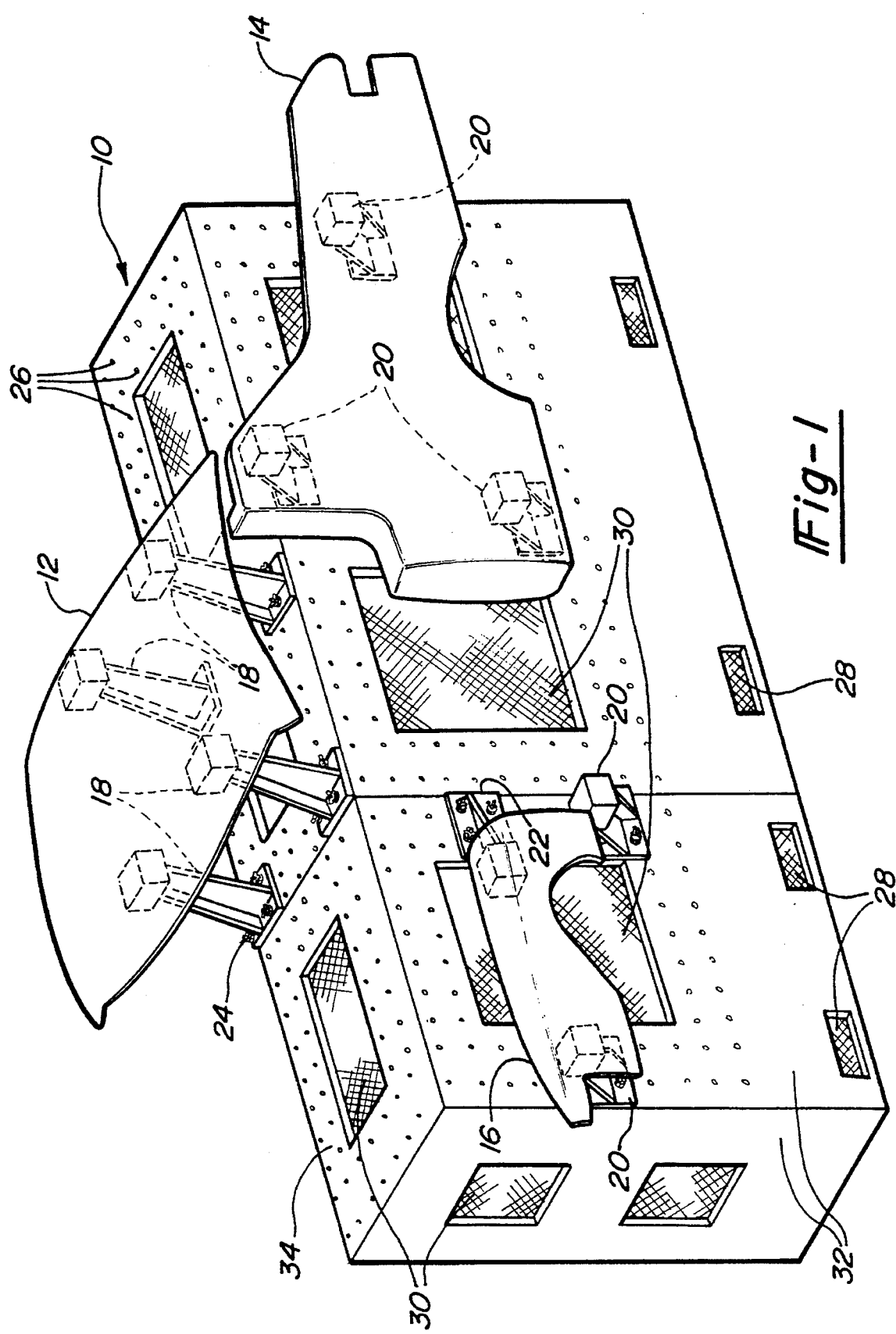
FIG. 1 is a perspective view depicting the preferred embodiment of the present invention illustrating exemplary risers, base cube, and sample parts.

Referring now to the drawings. FIG. 1 shows the preferred embodiment of the universal inspection workpiece holder. As shown, the base unit 10 is supporting several workpieces. In this case, a roof 12, rear quarter panel 14, and front quarter panel 16 for an automobile are shown, being supported and positioned by a plurality of risers 18,20,22.

The risers 18,20,22 are attached to the base unit 10 by means of a fastener 24 positively located and secured through the risers 18,20,22 into a predetermined matrix of untapped or straight-walled holes 26 having an adequate distance from each other such that any size and shape workpiece can be positioned and supported by the aforementioned risers 18,20,22.

In the preferred embodiment, holes 26 are arranged in each of the vertical faces 32 and in the horizontal top face 34 in a matrix where each hole is equally spaced 100 mm apart from any adjacent hole. This spacing is provided as an example only and is not meant to limit the invention. Preferrably, the holes in the risers 18,20,22 should have the same spacing arrangement or a multiple thereof.

Areas of the base unit 10 are cut out to form windows 30 in the work surface to reduce the weight of the overall system. The size, shape and number of the windows 30 will vary and be determined by the size of the base unit 10, workpieces required, and applications of the invention. Smaller rectangular windows 28 are provided on each vertical surface to allow a lifting machine such as a fork truck or crane to efficiently lift the system to transport. It is again understood that the number and placement of risers 18,20,22, workpieces 12,14,16, and weight reduction windows 28 are exemplary only.

The base unit 10 is a single integral casting that has a generally cubical configuration with rectangular machined faces. The base unit 10 preferably includes a plurality of vertical faces 32 and a top horizontal face 34. As shown in FIG. 1 the base unit 10 is hollow.

FIG. 2 shows an exploded view of templates 36 attached to the base unit 10. The templates 36 have cut outs 37 that are used to aid in placement of the risers. The templates 36, are the same size as faces of the base cube 10 or a portion thereof and are located and attached to the base unit 10 by dowel pins 38 inserted into holes 26 and corresponding holes in the templates 40. By using predesigned templates 36, the placement of risers 18,20,22 is greatly facilitated decreasing set-up time and increasing the repeatability factor.

The base unit 10 may contain support ribs 42 inside the base unit 10 to increase structural strength. The support ribs 42 are cast into the base unit 10 at predetermined locations inside the hollow portion of the base unit 10 and run horizontally, vertically, or diagonally from one face of the cube to an opposing side or corner.

Continuing with FIG. 2, the base unit 10 has foot pads 58 located on each corner and along the sides of the horizontal bottom surface. The foot pads 58 are made of high strength steel or other material resistive to impregnation of foreign materials. The foot pads 58 are fastened to the base unit 10 to assist in maintaining a level surface by resisting foreign material impregnation and reducing the area in contact with the floor surface.

Figure 3:
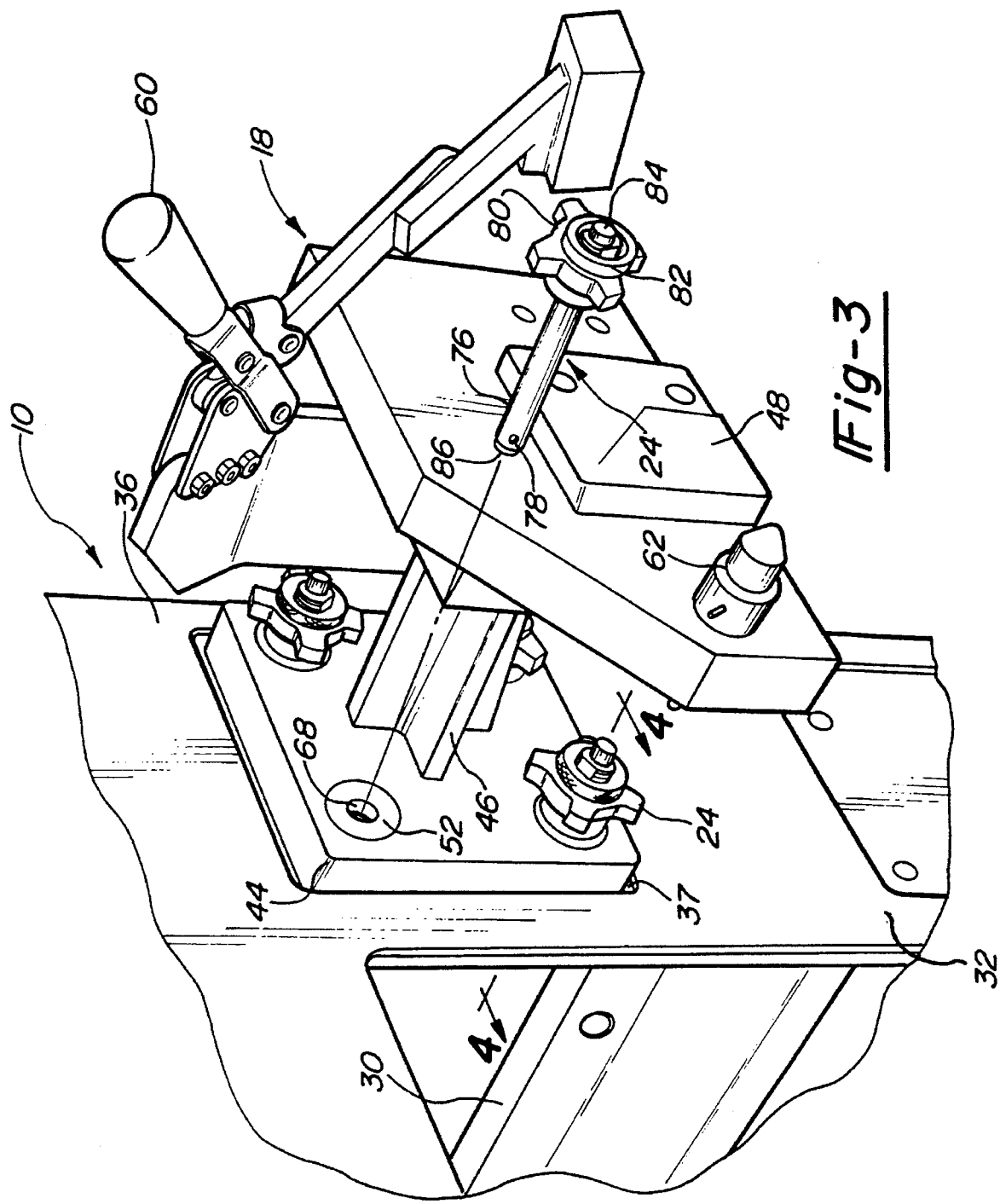
FIG. 3 is an exploded view of a riser illustrating the template, riser, and fastener.

Turning to FIG. 3, a detail of riser 18 is depicted being attached to the base unit 10, located by template 36, and secured by a plurality of fasteners 24. Each riser 18 is an integrally cast member that includes a riser base 44, extension 46, and holding section 48. The riser 18 is provided for positively locating and supporting a given workpiece at a predetermined dimension and location with respect to the base unit 10.

The riser 18 shown in FIG. 3 has a straight extension 46 in which the holding section 48 is spaced from the base unit 10 but relatively in the same orientation in the XY axis. The extension 46 can be straight, angled, or any other orientation or length depending on the desired location of the holding section 48 in relation to the riser base 44.

The holding section 48 can accept a clamp 60, pin 62, or other device used to secure a workpiece. The holding section 48 can be in various sizes and shapes having drilled and tapped holes accepting the aforementioned securing devices.

Figure 4:
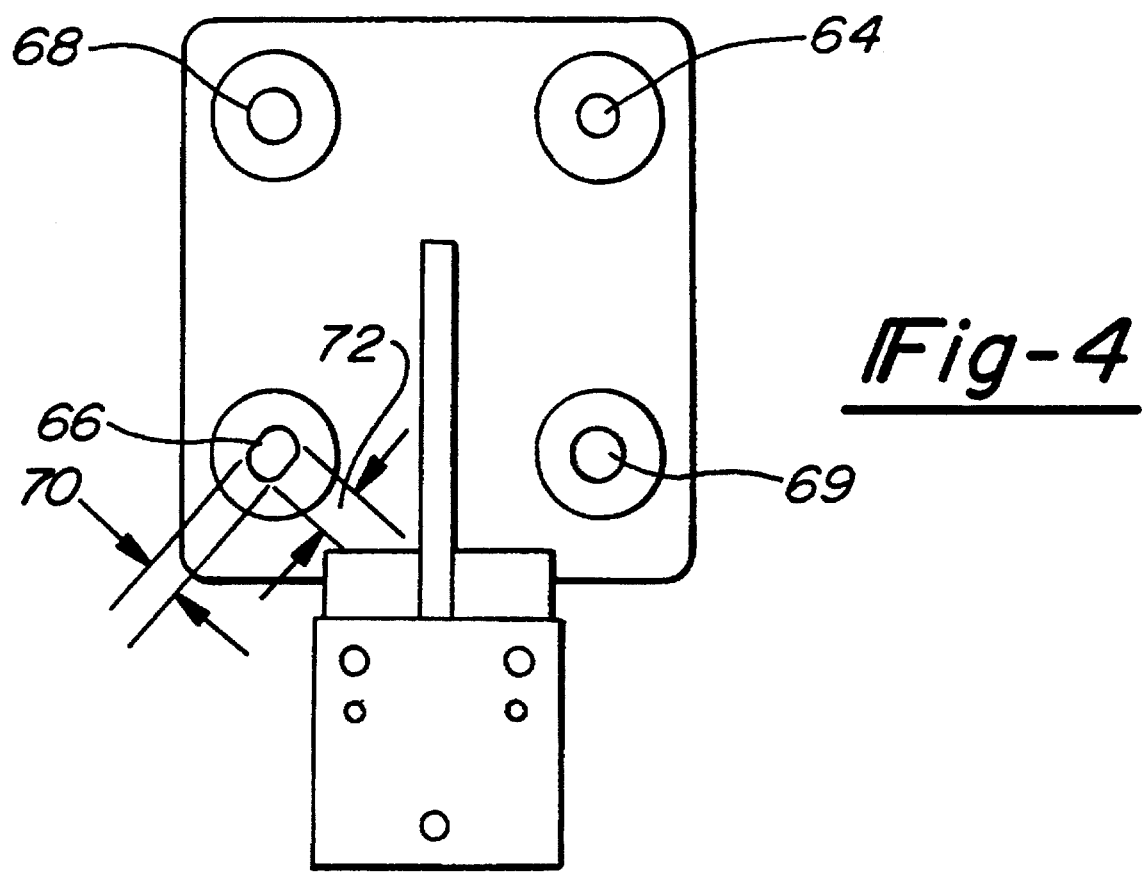
FIG. 4 is a top view of the riser base illustrating the aperture configuration.

FIG. 4 shows a detailed picture of the four apertures 64,66,68,69, located in the riser base 44, one located at each of the four corners of the riser base 44 and perpendicular to the horizontal bottom surface of the riser base 44. As illustrated, the strict tolerance aperture 64 is located diagonally opposite the slotted aperture 66, with the narrow dimension 70 of the slotted aperture 66 equal to the diameter of the strict tolerance aperture 64. The length 72 of the slot is approximately double that of the narrow dimension 70. The other two securing apertures 68,69 are located diagonally opposite each other and are slightly larger in diameter than the strict tolerance aperture 64. Slotted aperture 66 has an axis that is perpendicular to an imaginary line that intersects the centerpoints of apertures 68 and 69.

Figure 5:
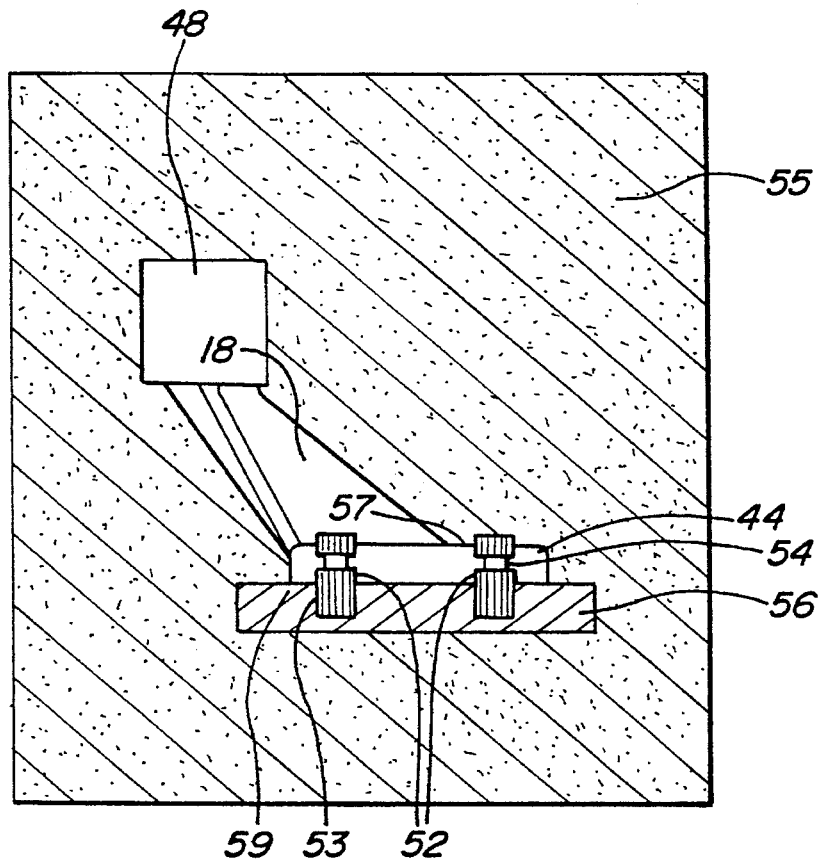
FIG. 5 is a top view of a sample riser mold illustrating the integral inserts and locating base for said inserts.

Referring to FIG. 5, an illustration of the riser mold, each aperture is formed by integrally casting a slug insert 52 into the riser base 44. Each insert is fixedly placed in predetermined support wells 53 which are formed into a sand mold 56. The insert 52 is approximately located in the sand mold 56 with a major portion of the insert 52 extending beyond the sand mold 56. The part of the insert 52 extending beyond the sand mold 56 contains a notched radial surface 54 and has a length greater than or equal to the amount desired to be incorporated in the riser base 44. The sand mold 56 is inserted in the two-piece riser mold 55 to hold the slug inserts 52 in position as molten material is poured into the mold to form the riser casting 18. The notched radial surface 54 in the insert 52 creates a positive retention means against tensile forces applied axially to the insert 52, e.g., by the fastener 24 whe the risers are in use. Once the riser 18 is formed, it is released from the two-piece riser mold 55 and excess molten flash and overflow material is removed. The riser 18 is placed in a milling machine where the top 57 and bottom 59 of the riser base 44 are machined flush to the riser base 44 and parallel to each other. The riser holding section 48 top surface is then machined flush and parallel to the bottom surface of the riser base 44. The four inserts 52 are precision bored perpendicular to the riser base 44 and holding section 48 top surface to form apertures 64, 86, 88 and 89. Holes are also drilled and tapped on the top surface and all four sides as required of said holding section 48 to provide means for various securing devices. In the preferred embodiment the inserts 52 are comprised of a copper-bronze alloy, namely AMPCO 18.

FIG. 6 is a cross sectional view of the fastener 24 as it is inserted through the riser base 44 and base unit 10 and secured by tightening of both the wing nut 80 and locking ring 82. As shown here, the fastener 24 is in the "locked" position. A spring 88 is in the uncompressed state pulling the locking rod 90 into the outer pin shell 78 forcing the lock balls 78 outwardly. The outer pin shell 76 has a strictly toleranced diameter for insertion into the riser base 44 and base cube 10 apertures. By depressing the release button 84, the spring 88 is compressed, the locking rod 90 is pushed outwardly allowing the lock balls 78 to retract inwardly becoming flush with the outer pin shell 76 thereby allowing the fastener 24 to be inserted or removed from the riser base 44 or the base unit 10. The guide chamfer 86 provides a lead edge which aids during insertion of the fastener 24 into a riser 44 or base unit 10.

As further shown in FIG. 6, once the fastener 24 is securely locked into position into the riser base 44 and base unit 10 the wing nut 80 is rotationally turned in a clockwise direction to screw tighten against the top face of the riser base 44. Once the wing nut 80 is tightened, the locking ring 82 is rotationally turned on the same threads to prevent the wing nut 80 from backing off the tightened position against the riser base 44.

Figure 7:
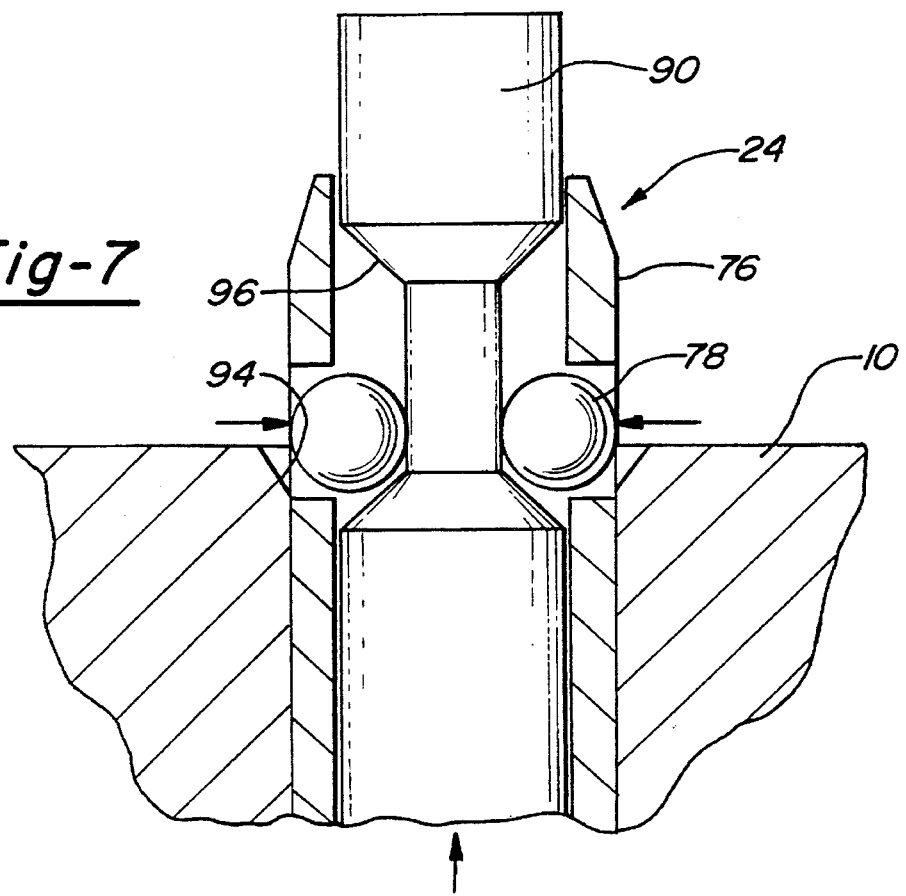
FIG. 7 is a cross-sectional view of the fastener illustrating how the balls lock the pin in place.

FIG. 7 shows a more detailed example of the ball detent within the fastener 24. The outward position of the lock balls 78 secures the fastener 24 by wedging the lock balls 78 against the base unit chamfer 94 of the base unit 10 and the outward taper 96 of the locking rod 90. The base unit chamfer 94 cams the lock balls 78 against the outward taper 96 of the locking rod 90 greatly reducing the force exerted directly on the lock balls 78 when the fastener 24 is under a removal load. When the locking rod 90 is biased outwardly from the outer pin shell 76, as shown in FIG. 7, the lock balls 78 are unrestricted and can fall radially inwardly, as shown by the directional arrows, to allow the fastener 24 to be removed.

The present invention provides a universal base that will accept a multitude of supporting means that are adaptable to various parts. This allows the same supporting means to be used for more than one part, reducing the amount of waste when a part changes or becomes obsolete. The templates provide a means for quick setup by dictating which holes in the base cube array to use and showing the location of the risers, thereby making part changeovers quick and efficient.

The pattern in the riser apertures 64, 66, 68 and 69 of the present invention eliminates the tolerance stack-up that is inherent in previous inventions by locating in four directions with the first aperture, locating in only two directions with the second slotted aperture, and fastening with the two remaining larger apertures. This invention also greatly reduces the cost of manufacturing by eliminating the requirement to precision machine sleeves, and pin assemblies.

Various other advantages and modifications will become apparent to one skilled in the art after having the benefit of studying the teachings of the specification, the drawings, and the following claims.

What is claimed is:

1. A system for holding and aligning a part, said system comprising:
    a hollow base cube with a plurality of faces, at least some of the faces having an array of equally sized and spaced straight-walled holes forming a grid pattern;
    at least one riser, said riser having a base containing apertures extending therethrough, an extension portion of a predetermined height with a holding section thereon for accepting a device for supporting a part;
    fasteners for providing positive location and fastening of the riser to said base cube, each fastener including a pin with an inner and an outer end, at least one locking member located near the inner end of the pin normally outwardly biased, control means for overcoming said biasing of said locking member, and an axially adjustable securing mechanism located near the outer end of the pin;
    said apertures are located in corners of said base perpendicular thereto, a first aperture being located in a first corner and being circular with a toleranced diameter, a second aperture being located in a second corner diagonally opposite the first aperture and being in the form of a slot with its narrowest width substantially the same size as the first aperture, a third aperture being located at a third corner of the base plate and having a circular geometry with a diameter greater than the diameter of the first aperture, and a fourth aperture located in a fourth corner diagonally opposite the third aperture and having a circular geometry with a diameter greater than the diameter of the first aperture, the slot having an axis perpendicular to an imaginary line that intersects the centers of the third and fourth aperture; and
    whereby each riser is positively located and fastened to the base cube by defeating said biasing of said locking member using said control means, inserting the fasteners through the apertures in the riser base and through the holes of the base cube, and releasing said control means returning the locking member to its normally biased position thereby locking the fasteners in place to fasten the risers to the base cube.

2. The system of claim 1 wherein the locking member in the fastener comprises:
    a pair of spherical balls located in the pin, the balls being normally spring biased in the radially outwardly direction.

3. The system of claim 1 wherein the control means comprises:
    a movable rod inside the pin, said rod having a section of reduced diameter inboard of an inner end of the rod, the outer circumference of the rod normally engaging the balls to bias them in the radially outwardly direction, the rod presenting said section of reduced diameter when the rod is moved in an axial direction to thereby permit the balls to move radially inwardly to release the fastener from the cube.

4. The system of claim 1 wherein the outer end of each fastener has a section of larger threaded diameter than the inner end and wherein each fastener further comprises:
    a wing nut threaded to mate with said pin's threaded outer section, having a top and bottom surface; and
    a lock nut threaded to mate with said pin threaded outer section.

5. The system of claim 1 wherein the base cube is has a plurality of vertical faces and a horizontal top face, each face containing s series of said evenly spaced holes establishing an X-Y grid surface which matches said apertures in said risers.

6. The system of claim 1 wherein the bottom side of the base cube has a series of feet fastened to the cube comprised of a hardened material capable of withstanding impregnation of foreign material.

7. The system of claim 1 wherein inner sides of the base cube holes are chamfered.

8. A casted riser for supporting a part being fastened to a base cube comprising:
    a base plate with a top and bottom surface and integrally casted slugs at predesignated generalized locations, each slug directly adhered to the material of the casted riser and, each slug having an aperture precisely machined therein and each slug having an outer perimeter larger than the aperture therein to thereby accommodate variances in the generalized slug locations due to casting process while permitting the apertures to be substantially precisely located relative to each other;

an extension section connected at one end to the base plate; and a holding section connected to an opposite end the extension section.

9. The riser of claim 8 wherein there are four slugs, each having an aperture, the first aperture being circular with a strictly toleranced diameter, the second aperture located diagonally opposed the first aperture and being a slot with a width substantially the same as the first aperture, the third aperture located at a third corner of the base plate having a circular geometry with a diameter greater than the diameter of the first aperture, and the fourth aperture being located diagonally opposite the third aperture having a circular geometry with a diameter greater than the diameter of the first aperture, the axis of the slot being perpendicular to a connecting line that intersects the center points of the third and fourth apertures.

10. The riser of claim 8 wherein each slug is axially restricted by means of a notch in said slug.

11. The riser of claim 8 wherein each slug is a copper alloy material.

12. A system for holding and aligning a part, said system comprising:

a hollow base cube with a plurality of vertical faces and a horizontal top face, each face having an array of evenly spaced straight-walled holes establishing an X-Y grid surface;

a plurality of risers for supporting the part, each of the risers having an attaching base containing four apertures in a base plate perpendicular thereto, the first aperture being circular with a toleranced diameter, a second aperture diagonally opposed to the first aperture being a slot with a width substantially the same as the first aperture, a third aperture located at a third corner of the base plate having a circular geometry with a diameter greater than the diameter of the first aperture, and a fourth aperture located diagonally opposite the third aperture having a circular geometry with a diameter greater than the diameter of the first aperture, the axis of the slot being perpendicular to an imaginary line that intersects the center points of the third and fourth apertures; an extension section of a predetermined height with a holding section thereon accepting a device for supporting the part;

a plurality of fasteners removably attaching the risers to the cube, each fastener including:

a) a pin with an inner and outer end, a pair of balls located in the pin, the balls being normally spring biased in a radially outwardly direction located near the inner end of the pin, a movable rod inside the pin, said rod having a section of reduced diameter inboard of the inner end of the rod, the outer circumference of the rod normally engaging the balls to bias them in the radially outwardly direction, the pin presenting said section of reduced diameter when the rod is moved in an axial direction to thereby permit the balls to move radially inwardly to release the fastener from the cube;

b) a wing nut, threaded to mate with a threaded outer section of the pin, having a top and bottom surface perpendicular to axial movement along the pin; and c) a lock nut threaded to mate with said pin threaded outer section, having a bottom surface perpendicular to axial movement along the pin;

whereby each riser is positively located and fastened to the base cube by inserting the fasteners through the apertures in the riser base and through the holes of the base cube, with the balls thereafter biased in the radially outwardly direction to lock the fasteners in place to hold the risers to the base cube.

13. The system of claim 12 which further comprises:

a plurality of templates selectively mounted to the cube, each template being associated with a given part and having cutouts therein for locating the proper positioning of the risers on the cube for its associated part.

14. The system of claim 1 wherein the base of the riser further comprising:

four integrally casted slugs at predesignated locations, each slug being formed of a material harder than the material of the casted riser, each slug being directly adhered to the material of the casted riser, and having a bored aperture perpendicular to the top and bottom surface.

15. The system of claim 12 wherein the attaching base further comprises:

four integrally casted slugs at predesignated locations, each slug being directly adhered to the material of the casted riser.

* * * * *